July 18, 1933. W. C. CALVERT 1,918,517
PRINTER'S BLANKET
Filed Feb. 17, 1930
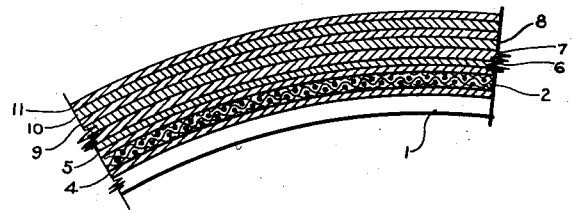
Inventor
William C. Calvert.
By
Attorney Patented July 18, 1933

1,918,517

UNITED STATES PATENT OFFICE

WILLIAM C. CALVERT, OF AKRON, OHIO, ASSIGNOR TO THE GOODYEAR TIRE & RUBBER COMPANY, OF AKRON, OHIO, A CORPORATION OF OHIO

PRINTER'S BLANKET

Application filed February 17, 1930. Serial No. 429,205.

This invention relates to the manufacture of coated fabrics and it has particular relation to the manufacture of fabrics employed as cushions upon the rollers of printing presses.

One object of the invention is to provide a pad or printer's blanket which is highly resistant to the action of oil and other deteriorating agencies and which still retains a high degree of resiliency.

Another object of the invention is to provide a printer's blanket of the above designated character which is relatively inexpensive to manufacture.

The plates and types employed upon ordinary printing presses are comparatively non-uniform as to thickness and for that reason, it is essential that the presser rollers of the presses for forcing the paper against the type be provided with a suitable yielding highly resilient surface coating which secures substantially uniform pressure between the roller and the surface of the types at all times even though the surfaces may be comparatively non-uniform in character. For this purpose, it is customary to secure a pad or covering consisting of a relatively thick woolen fabric which has been matted or felted upon one or both surfaces about the surface of the presser rollers of the press. In order to prevent penetration of the inks employed in printing, the blankets or pads are usually coated upon the exterior surface with a ply of rubber, nitro-cellulose or other highly impermeable material. Unfortunately, rubber coatings are objectionable because the oils and greases which are used in the printer's inks tend to cause premature decay of the rubber and, as a result, the latter soon weakens, cracks and tends to peel off of the surface of the blanket. Nitrocellulose frequently used as a substitute for rubber coatings upon the blankets is insoluble in oils. However, it is comparatively soluble in esters, alcohols and other ordinary organic solvents which sometimes are desirable in inks.

This invention consists in the provision of a printer's blanket which is coated upon at least one side with a ply of regenerated cellulose. The latter material is substantially insoluble in oil and is not affected by most of the organic solvents, such as alcohols, acetones, etc. For a better understanding of the invention, reference may now be had to the accompanying drawing, the single figure of which is a cross-sectional view of a printing drum having the improved blanked applied thereto.

A drum 1 is provided with a blanket structure comprising a relatively resilient base 2, which is preferably composed of a heavy woven woolen fabric which has been felted upon both sides, preliminary coatings 4 and 5 of rubber of a thickness of approximately .003 of an inch upon one side and upon the other side of a thickness of approximately .007 of an inch. The rubber coatings may conveniently be cured while they are subjected to pressure between layers of ordinary holland cloth. The thickness of the entire sheet of material after the rubber has been vulcanized is approximately .75 of an inch. The next step in the preparation of the blanket comprises the application of at least one and preferably two coats 6 and 7 of ordinary rubber cement which preferably should include 2 or 3 percent of sulphur together with an ultra-rapid accelerator, such as the diethyl amine salt of mercaptobenzothiazole, which is capable of producing vulcanization in rubber even at ordinary room temperatures and pressures.

In case two coatings of rubber cement are employed, sufficient time should be allowed between the two applications to permit the first coating to dry at least partially. A coating 8 comprising 150 grams of latex of a concentration of approximately 67.5 percent of rubber suspended in a solution of 7.5 grams of 70 percent of sodium hydroxide and 96 grams of water and known as solution A is then applied. A fourth coating 9 consisting of 50 grams of solution A, 25 grams of water and 50 grams of a solution termed B is also applied to the fabric after the first coating has been permitted to dry. Solution B above referred to consists of 300 grams of gelatin, 180 grams of polyglycerol and 1020 grams of water. The thickness of this fourth coating may vary materially though satisfactory results have been obtained when it is equivalent to that obtained by spreading approximately 50 grams of the material upon a sheet of 12 yards length and approximately 42 inches width. The next coating 10 comprises a mixture of 25 grams of solution A and 100 grams of solution B. The thickness of this coating may also be varied within wide limits. However, it has been found preferable to use approximately the same amount of material as employed in the fourth coating. This coating is also permitted to dry and is then treated with ten or eleven thin films of solution B. Finally, a sheet 11 of cellophane consisting of approximately 40 percent of regenerated viscose and 60 percent of glycerol is applied to the surface of the gelatin coating. The cellophane preferably should be soaked in a 5 percent solution of polyglycerol for a period of time before its application to the fabric. In order to secure maximum flexibility of the coating, it is also desirable to dry it and then spread thereon a 10 percent solution of polyglycerol. This solution is left standing upon the surface of the material for a period of about 15 minutes and then the excess is wiped off in any convenient manner.

Cellulose coatings may also conveniently be applied to a rubber coated printer's blanket material by coating the surface of the latter with a self-curing rubber cement containing approximately 2 or 3 percent of sulphur and an ultra-rapid accelerator, such as previously described and then applying a sheet of ordinary cotton fabric having a coating of regenerated cellulose thereon. A coated fabric, suitable for this purpose, may conveniently be prepared by spreading viscose in an ordinary manner upon the fabric and then regenerating the latter by a suitable agency, for example, a solution consisting of 18 parts of glycerol suspended in 48 parts of alcohol which contains 6 parts of boric acid and 54 parts of water. This type of regenerating bath is particularly suitable for the purpose because its concentration is such that there is little or no tendency to cause blistering between the cellulose coating and the fabric because of osmotic diffusion of the regenerating bath through the viscose. It is, of course, to be understood that the cellulose coatings applied to the cotton fabric in this manner are to be treated with a suitable softening agency, such as glycerol or preferably polyglycerol.

The above described method of coating may also be employed in the manufacture of draw sheets from ordinary cotton fabrics. These draw sheets are disposed as separable units upon a suitable cork or felt cushioning base about the presser roller and are held in positon by any convenient mechanical clamping and tensioning agency. Printer's blankets which have been coated with cellulosic material in the manner described possess a remarkable degree of durability and flexibility. They are also substantially unaffected by oils and organic solvents which cause premature deterioration of blankets that have been coated by means of ordinary materials. Because of the extremely high flexibility and elasticity inherent in blankets prepared in this manner, uniformly excellent quality of work is assured by use of the blankets throughout the life of the latter.

Although I have described the preferred embodiments of the invention, it will be apparent to those skilled in the art that the invention is not so limited but that various modifications may be made therein without departing from the spirit of the invention or from the scope of the appended claims.

What I claim is:

1. A printer's blanket comprising a heavy woven textile material having felted surfaces thereon, rubber coatings upon the felted surfaces, cement coatings upon the rubber surfaces and an outer coating of regenerated cellulose upon the cement.

2. A printer's blanket comprising a heavy woven material having at least one felted surface and a ply of cellophane secured to the latter.

3. A printer's blanket comprising a heavy woven material having at least one felted surface and a ply of regenerated cellulose secured to the latter.

4. A printer's blanket comprising a heavy woven base having a felted surface, a coating of rubber upon the felted surface, a ply of latex upon the rubber, a ply of gelatin upon the latex, and a sheet of regenerated cellulose upon the gelatin.

5. A printer's blanket comprising a heavy fabric having a felted surface, a vulcanized rubber coating upon the felted surface, and a ply of fabric having a coating of regenerated cellulose secured to the felted surface of the material.

6. A printer's blanket comprising a body having secured thereto a coating of regenerated cellulose containing polyglycerol.

7. A printer's blank comprising a body in which is incorporated a ply of regenerated cellulose containing polyglycerol.

8. A printer's blanket which is protected upon the exterior surface by a ply of regenerated cellulose containing polyglycerol.

9. A printer's blanket comprising a heavy woven material having at least one felted surface and, secured thereto, a layer of regenerated cellulose containing polyglycerol.

10. A printer's blanket comprising a heavy fabric having a felted surface, a vulcanized rubber coating upon the felted surface, and a ply of fabric having a coating of regenerated cellulose containing polyglycerol secured to the felted surface of the material.

11. A printer's blanket comprising a heavy woven base having a felted surface, a coating of rubber upon the felted surface, a layer of latex upon the rubber, a layer of gelatin upon the latex, and a sheet of regenerated cellulose containing polyglycerol upon the gelatin.

12. A printer's blanket comprising a heavy woven textile material having felted surfaces thereon, rubber coatings upon the felted surfaces, cement coatings upon the rubber surfaces and an outer coating of regenerated cellulose containing polyglycerol upon the cement.

WILLIAM C. CALVERT.